United States Patent
Kaeseler et al.

(10) Patent No.: US 6,906,276 B2
(45) Date of Patent: Jun. 14, 2005

(54) RESISTANCE SPOT WELDING CONTROL DEVICE AND METHOD

(75) Inventors: Werner Kaeseler, Baunatal (DE); Horst Muller, Baunatal (DE)

(73) Assignee: Reu-Schweisstechnik GmbH, Baunatal (DE)

(*) Notice: Subject to any disclaimer, the term of this patent is extended or adjusted under 35 U.S.C. 154(b) by 171 days.

(21) Appl. No.: 10/203,452

(22) PCT Filed: Feb. 9, 2001

(86) PCT No.: PCT/EP01/01421
§ 371 (c)(1),
(2), (4) Date: Nov. 27, 2002

(87) PCT Pub. No.: WO01/58636
PCT Pub. Date: Aug. 16, 2001

(65) Prior Publication Data
US 2003/0132201 A1 Jul. 17, 2003

(30) Foreign Application Priority Data
Feb. 9, 2000 (DE) ......................... 100 05 963

(51) Int. Cl.⁷ .............................................. B23K 11/10
(52) U.S. Cl. .................................. 219/86.41; 219/110
(58) Field of Search ............................. 219/86.41, 109, 219/110

(56) References Cited

U.S. PATENT DOCUMENTS 3,553,420 A  1/1971  Shearer et al.
4,441,006 A  4/1984  Machida et al.
5,483,035 A  1/1996  Kawai et al.

FOREIGN PATENT DOCUMENTS

DE  199 17 896 A1  10/1999
EP  0 352 154 A1   1/1990
EP  0 813 928 A2  12/1997

*Primary Examiner*—Clifford C. Shaw
(74) *Attorney, Agent, or Firm*—Browdy and Neimark, P.L.L.C.

(57) ABSTRACT

The invention relates to a control device for spot welding with a welding electrode pincer (Z), the welding electrodes (E1, E2) of which are connect to a welding current generator (IS) and an electric motor drive (M), with a rotary transducer (RES), the signal of which is used by a control device (MP) to control the welding electrode pincer (Z). The closed state of said pincer holds the objects for welding (B1, B2) together, by means of a pre-set motor current (MAI), whereupon the welding current generator (IS) is activated. The control device (MP) comprises monitoring devices (const, max), to which the rotary transducer signals (RES) and/or a motor current measured signal (I(t)) are constantly supplied. Once a quasi-constant state is recognized, following a close signal for the welding electrode pincer (Z), a corresponding first state is recorded as the closed state and the welding current generator (IS) activated. Thereafter, as soon as the exceeding of a maximum value is reported, a further closed state is recorded, the welding current generator (IS) deactivated and a holding timer unit (CTT) activated, after the expiration (end) of which the on- and off-control of the welding electrode pincers is activated again.

20 Claims, 2 Drawing Sheets

RESISTANCE SPOT WELDING CONTROL DEVICE AND METHOD

The present invention relates to a control device for spot welding with an electrode holder, the welding electrodes of which are connected to a controllable welding current generator and which can be actuated to open and close by means of an electric motor drive having a position sensor disposed on it, the signals of which are used by the control device to actuate the electrode holder to open and close according to predefined settings, and wherein, in the closed position of the electrode holder, the same holds welding objects clamped between the welding electrodes by means of a pre-set motor current, wherein the welding current generator is activated at certain times by the control device, and wherein the position sensor is an angular-motion transducer, resolver, and the control device comprises monitoring devices to which the angular-motion transducer signals are continually routed and wherein, as soon as this monitoring device senses a quasi standstill on the angular-motion transducer signals after a closing actuation of the electrode holder, a corresponding first state is recorded as the closed position of the electrode holder and the welding current generator is activated and a time curve for a welding electrode distance is then determined from the resolver signals, in dependence upon which time curve the motor current and/or the welding current of the welding current generator are pre-set with a different setting, so that the curve of the welding electrode distance approximates a pre-recorded curve of an optimal welding process.

A welding device of this type is known from DE 199 17 896 A. In this device an amount of wear of the electrodes is detected by sensing the electrode position and its relative displacement, based on which an adaptation of the welding parameters is performed regarding the clamping force of the electrodes, the welding time, and welding current value. The detection of the relative electrode position is impacted very unfavorably regarding its accuracy by the transfer elements that are located between the electrodes and the motor with the measuring means, namely a gear with a high gear ratio, since the end play, automatic interlock in reverse, and inertia of masses impact the value and time signaling.

Furthermore, from EP 0 278 185 B 1, a device is known wherein an electric motor actuates the electrode holders at the beginning of a welding cycle to assume a closed position. If a position sensor subsequently detects a closed state, a pre-set closing force is maintained at the welding electrodes by regulating the motor drive, and a welding current is then supplied to the electrodes. If an increase in force is detected due to an expansion of the weld because of the melting process, the welding current is switched off and an increased holding force is maintained for a pre-set length of time, after which the electrode holders will open. This type of control requires displacement measuring devices and force summing devices. A complete monitoring of the welding process does not take place, so that splattering and thus the formation of shrinkage cavities in the weld cannot be ruled out, especially when welding high-alloy steel plates.

A similar device and method for its operation is known from U.S. Pat. No. 3,553,420. It incorporates electrode contact pressure means with a hydraulic actuator, the hydraulic medium of which is held in the actuator by means of a locking valve after a pressure increase within the medium that is caused by the reaction force during the contact pressure of the electrodes and, hence, pressing together of the objects to be welded in the welding zone, after which the welding current is applied onto the electrodes and the pressure of the medium is monitored with a pressure sensor and, when the pressure has risen above a predefined level due to a thermal expansion of the weld and subsequently starts to drop again due to the liquefaction of the material, the welding current is reduced or immediately turned off completely, whereupon, after a predefined holding time, the locking valve is opened and the object or electrodes are repositioned.

Welding devices are furthermore known from DE 32 41 897 C 2, wherein the welding electrodes are contacted to the welding object via a spring, the spring displacement of which is detected by means of a sensor, e.g., a wire strain gauge setup, and the displacement of the electrodes due to the thermal expansion and subsequent melting is thus measured and utilized to switch off the welding current and control the opening actuation. This requires extensive measuring instrumentation and complicates the clamping means created by the spring.

It is the object of the present invention to improve the above-described device for a controlled and regulated welding and to improve the welding result.

This object is met in such a way that, in the closed position, the motor current is regulated such that a welding electrode distance, which is continually determined by summing the angular-motion transducer signals, is held nearly constant or according to a pre-set time curve.

Advantageous embodiments are specified in the subclaims.

The new device is based on a modern, fast-acting electrical electrode holder that is actuated via a force or position control device. To control the welding process, no additional measuring means are required, unlike in the known devices, instead the means and signals of the electric force or position control device of the motor drive and thus of the electrode holder are utilized. The electric control circuit for the electrode movement and electrode contact pressure incorporates an external reference value signal whereby the electric current is defined, which, starting from the motor, ultimately produces the electrode holder actuation and electrode clamping pressure via the mechanical coupling elements. A high degree of accuracy for the electrode position measurement is attained in such a way that the influences by the gear are warded off by the continuous motor regulation.

When the thickness of the welding object changes due to being heated with the welding current while the electric current generation is kept constant, a displacement is signaled by the position signal transducer, the incrementally operating angular-motion transducer that serves to control or regulate the welding current.

If, alternately, the motor control receives a pre-set constancy of the angular-movement transducer position after a certain contact pressure force has been reached based on a certain electric current, the motor current, which is regulated accordingly, increases in dependence upon the increasing thermal expansion to compensate for the change in the object thickness, and its drive current curve over time is analyzed based on certain criteria and utilized for the welding current control or regulation.

Also, a combination of the displacement signal curve and motor signal curve can advantageously be used to control or regulate the welding current, and a consecutive use of the two alternatives can advantageously be utilized when the reference value is changed, e.g., when a displacement constancy control is used initially, during which the electric current change is observed and analyzed, and a transition is then made based on a pre-set threshold value, to an electric current constancy control, during which the displacement signal change is observed and analyzed. The parameters to be selected for an optimum weld depend on the materials that are to be welded together, their surface properties and coatings, the condition of the electrodes, and the geometries of the objects and electrodes.

The welding control program that performs the electric current and/or angle or displacement value analysis is one and the same program if these different types of measuring values are suitably correlated. The correlation results from the displacement increment, which provides an electric current increment through the accompanying angular-motion transducer signals.

When the welding current is switched on, a pre-set output current from the regulator and a starting distance of the welding electrodes from one another are present. As the temperature increases in the welding region, the motor current increases and/or the distance of the electrodes increases, causing, e.g., incremental displacement signals to be emitted by the angular-motion transducer, which are summed to a distance difference value relative to the starting distance. A correlation of the electric current difference to the displacement difference exists via the change in current, which produces a distance change by one increment. When correlated in this manner, both changes can be summed and this sum is compared to a threshold value, the exceeding of which is detected; and/or the sum value curve is used to detect the approaching, reaching or exceeding of a maximum.

At that specified point in time the controller instructions, i.e., the reference distance and/or referenced drive current, the welding current value, as well as the start of a holding time and/or new threshold value for said sum value are pre-set, at the end of which, or if they are not met, the welding current is switched off completely and the electrode holder is actuated to open.

When the moment of the approaching, reaching or exceeding of the sum value maximum from the measured values is utilized, the melting process that occurs in the weld is detected with respect to a critical parameter and turned into a shutoff criterion for the welding current. The partial and/or complete shutoff and termination of the holding time, which serves to permit the undisturbed solidification of the welding spot, is preferably performed by means of a time lapse control. To attain an optimum crystalline structure when the welding spot cools off, an increasing electrode holder force may advantageously be applied via a corresponding motor current setting.

If the shutoff sequence is controlled in dependence upon a threshold value, the exceeding of the maximum, its level, and the further decrease in the thermal change of the weld can nevertheless be detected with respect to time and, e.g., presented in table or image form and threshold values can advantageously be monitored, so that the welding process is thoroughly monitored at all times and impermissible changes that occur in the conditions, e.g., due to variations in the material or changes on the sheet steel surfaces or electrodes, as well as in the drive system, are detected and they can be compensated for with new settings or reported to an operator or superior system, as well as archived as a maintenance aid and for quality control purposes.

A process sequence is listed below:

A—Move electrode holder into position on the work piece, then

B—Actuate electrode holder closing until the angle signal or displacement signal and electrode holder drive current remain constant for a length of time, then C—Switch on welding current and monitor the displacement signal and/or electrode holder drive current to detect when the maximum is reached. After it has been reached:

D—Switch off welding current; regulate electrode holder drive current based on time, displacement and force settings; monitor the holding time curve. After completed time curve:

E—Actuate electrode holder to open until pre-set distance has been reached.

—Continue as in A-.

Determining the maximum thermal change of the weld by detecting the electric current constancy and/or standstill of the electrode holder drive is performed with the use of suitable filtration measures and/or certain signal recognition response bandwidths because irregularities in the force, displacement and electric current curve must be expected, which can occur, among other things, due to the increment-decrement signal output on the displacement indicator, as well as due to external disorders or hunting of lower amplitudes.

Particularly suitable for the closing actuation of the electrode holder are non-self-locking ball spindle drives, which have a relatively high force-to-weight ratio. The motor is a brushless three-phase a.c. motor or d.c. motor. Disposed on its shaft is a shaft encoder, a so-called angular-motion transducer, i.e., a step signal transducer, which emits directional pulses. Commonly, 1024 to 32768 steps are provided per motor revolution. With a suitable thread pitch, it is possible to signal a displacement of 1 mm, which is one order of magnitude smaller than the expansion of a weld joint of thin sheet steel.

A regulation to a constant electrode holder closed position, i.e., a regulated "locking" of the electrode holder, takes place within a few microseconds as soon as a displacement pulse is detected. Since the signal curve on the closing drive for each welding process is very similar for corresponding welds on identical work pieces as long as no malfunction occurs, an optimum electric current time curve is advantageously recorded and utilized as an electric current reference curve for a subsequent welding process, which limits the controller activity to compensating for slight variations from the reference curve and thus improves the control quality. The controller thus has not only a customary PID behavior, depending on its given setting, but also an ability to learn.

The signal processing of the angular-motion transducer signal with the corrective signal generation that is dependent thereon, preferably occurs in a microprocessor which generates the displacement signal from the summed angular-motion transducer signal and, through suitable filtration of the differential displacement signals, i.e., angular-motion transducer signals, and a continuous monitoring of threshold values, detects a quasi-standstill of the drive or a pre-set rate of rise or a pre-set drop in the displacement signal by monitoring the subsequent speed of the angular-motion transducer signals, i.e., the differential signals, using a threshhold-value monitoring to determine the approaching, exceeding and/or reaching of a maximum.

The filter parameters and the threshhold values and rates of increase or decrease that need to be pre-set can be made available as a reference value setting, e.g., through a keyboard entry and optionally varied so that the device can easily be adapted to differing electrode holder geometries and designs and effects of wear, as well as changes in components or materials, especially of the electrodes and welding objects.

The welding current may be supplied by a mains transformer with phase control. As is well known, the current flow in the individual phases always goes to zero in the zero crossing. The phase angle and number of half-waves are accordingly preset for an electric energy supply control in each case. When the shutoff occurs due to the event of the maximum weld expansion having occurred, a phase that has already been fired will supply electricity until it ends. It is thus advantageous to shut off early enough so that the remaining phase does not result in an exiting of welding material.

Measuring the rate of increase of the expansion of the weld offers the possibility to limit the maximum electric current early on if the electric current increase exceeds a pre-set standard value. Conversely, the rate-of-rise evaluation of the electric current increase at a speed that is below a certain standard, will be utilitized to increase the maximum current. The maximum current is defined by selecting the operating angle. Medium-frequency electric current supply units, which have a very exact cutoff per se, may, of course be used as well.

To implement a very swift regulation, it is advantageous to measure the time intervals of the angular-motion transducer signals for the same direction, which immediately produces the rate of change of the displacement through inversion of the distance values.

The electric current signals, too, can be represented by a signal-tracing analog-to-digital converter with its counting signals, which its comparator usually routes to a digital counter; and their time interval, appropriately inverted, is a measure for the increase or, in the case of signals of the opposite counting direction, for the decrease of the electric current.

Resistance spot welding is used, particularly in the automobile industry, to connect metal sheets having, in each case, a thickness between 0.5 to 3.5 mm. The welding electrodes clamp these pieces of sheet steel together in the welding zone so that three current conduction areas are created in series, two of which are the contact areas of the cooled electrodes with the adjoining sheet steel, and one is from sheet steel to sheet steel. To attain a good weld, the resistance from sheet steel to sheet steel should be as large as possible compared to the resistances at the electrode contact surfaces, so that the electrodes do not melt onto and become alloyed to the surface, especially a galvanized protection layer, of the sheet steel and, on the other hand, a nugget-shaped melting zone forms between the pieces of sheet steel. The objective for the melting zone is to largely intersperse the metal sheets but not break open on the surface next to the electrode or laterally between the metal sheets, so that no material can splatter out, and a nearly continuous full connection is attained after the weld has cooled off.

Preventing sparks and splatter also has the great advantage that no impurities result on the welding objects and equipment, and cleaning, maintenance and reworking costs can be saved and splash guards on the equipment can be dispensed with.

Especially the modern, high-alloy metal sheets tend to splash since their material liquefies very abruptly.

In addition to the requirement for the quality of the welds, there is the need for a continuous monitoring and documentation of all welds regarding their quality.

Additionally, it is important to keep the welding cycle time as short as possible without sacrificing quality.

The existence of all conditions that are necessary for a high-quality weld is derived, in an improvement of the invention, from the thermal deformation behavior of the given weld, and deviations therefrom that are detected serve to optimize the predefined settings while taking into account short welding periods. A plurality of test welds with a given type of sheet steel and thickness and a certain electrode design are utilized in this manner to pre-set the rate and duration of the electric current supply and their total time curve so that the shortest possible cycle time can be attained during which splatter does not yet occur.

It has been shown that customary metal sheets of a thickness of 0.5 mm to 3.5 mm per sheet reveal a uniform characteristic expansion behavior of the weld, and that the melting process and a beginning run-out are apparent from the process curve. The melting process generates an increasing expansion at the weld, which is the larger, the thicker the metal sheets. When the liquid welding spot approaches the surface of the metal sheets, this surface becomes slightly indented due to the sustained pressure from the electrode holder, and the expansion thus exceeds a maximum. Utilizing this effect, the electric current supply is shut off when the expansion change decreases, depending on the type of sheet metal, either shortly before the maximum or exactly at the time when it occurs, or also slightly delayed, and a holding of the electrode contact pressure is initiated for a certain holding time, during which the recrystallization of the welding spot takes place. Reaching the maximum guarantees the required depth expansion of the welding spot and, therefore, of the connection region and its anchoring in the structure.

For subsequent welding processes, the intensity of the welding current is increased in each case in steps, so that the resulting time until the maximum occurs is accordingly shorter. The highest electric current level and shortest welding time are exceeded or undercut in each case when a steep break-in of the weld occurs near the maximum, or shortly afterwards, indicating an exiting of the liquid material. If the future welding current is accordingly preset approximately 20% below the critical value at which the run-out occurred, the optimum conditions are created for the given type and thickness of sheet steel.

The standardized monitoring of the occurrence of the expansion maximum and possibly a break-in result in the respective optimum welding process and reliable quality assessment of the weld. Deviations from the expansion curve and a noticeable change in the duration of the electric current supply time are signs for possibly disadvantageous influences on the setup. These may be changes on the metal sheets, especially on their surfaces or coatings, or on the contact surfaces of the welding electrodes. The latter should be designed convex with a flattened area having a diameter of a few millimeters, so that the welding current flows concentrated onto a defined narrow region in the center of the weld point.

The flattened areas of the electrode tips penetrate slightly into the sheet steel surface due to the high electrode holder force, while cooling the same including its galvanic protective layer to a degree that no melting takes place at that location, with the result that the protective layer remains intact and no surface material splatters out, which would result in impurities.

The high pressure of the electrodes clamps the metal sheets, if they are 0.5 to 1.5 mm thick, together in such a small region that a high electric current density and thus increasingly growing welding spot occur.

With greater sheet steel thicknesses an unevenness is frequently observed that is significant enough so that the usual contact pressure does not produce a central small-surface contact. This can result in a considerable lengthening of the welding time, the observed expansion maximum occurs later than expected. This information is advantageously utilized in such a way that a heating and smoothing process is performed prior to the actual welding process in such a way that heating pulses are generated in the metal sheets by using a considerably lower current intensity, e.g., half of the intensity that will subsequently be required for the optimum welding process, and considerably shorter electric current flow times compared to the welding time, which result in the sheet metal relaxing and settling in the region of the electrodes. This settling movement is also monitored by observing the signals on the angle transducer of the electrode holder drive. When virtually no more settling movement occurs from a heating current pulse, the welding is started with the full pre-set electric current intensity.

It has been shown to be advantageous if high-alloy sheet steel, which is increasingly being used and which tends to result in the liquid weld spot breaking through, is treated with a controlled electric current increase, i.e., a trapeze welding current pulse or corresponding step increase instead of a rectangular welding current pulse. The most favorable rate of rise of the welding current increase can also be determined through sample welding processes, in which the occurrence of the impermissible quick break-in of the weld spot is used as a criterion for a stepwise reduction in the electric current increase until break-ins can reliably be ruled out.

If excessive settling times or an unexpected breaking through occur in the course of the ongoing operation, this is immediately countered by a further change in the above parameters. The malfunctions are additionally documented and displayed so that the cause can be researched and remedied.

It is known to select the clamping force of the electrodes to match the sheet steel thickness and electrode design. If the malfunctions occur in the drive system so that the clamping force that is created by the electric current flow to the motor is not fully effective on the electrodes, this also has a significant effect on the angle measuring signal since the settling takes place with a delay and the pressure indentation after exceeding the maximum of the welding spot expansion is reduced. The latter also occurs in conjunction with a greater welding energy absorption when the electrodes become more flattened.

Advantageous embodiments are shown schematically in FIGS. 1–3.

Figure 1:
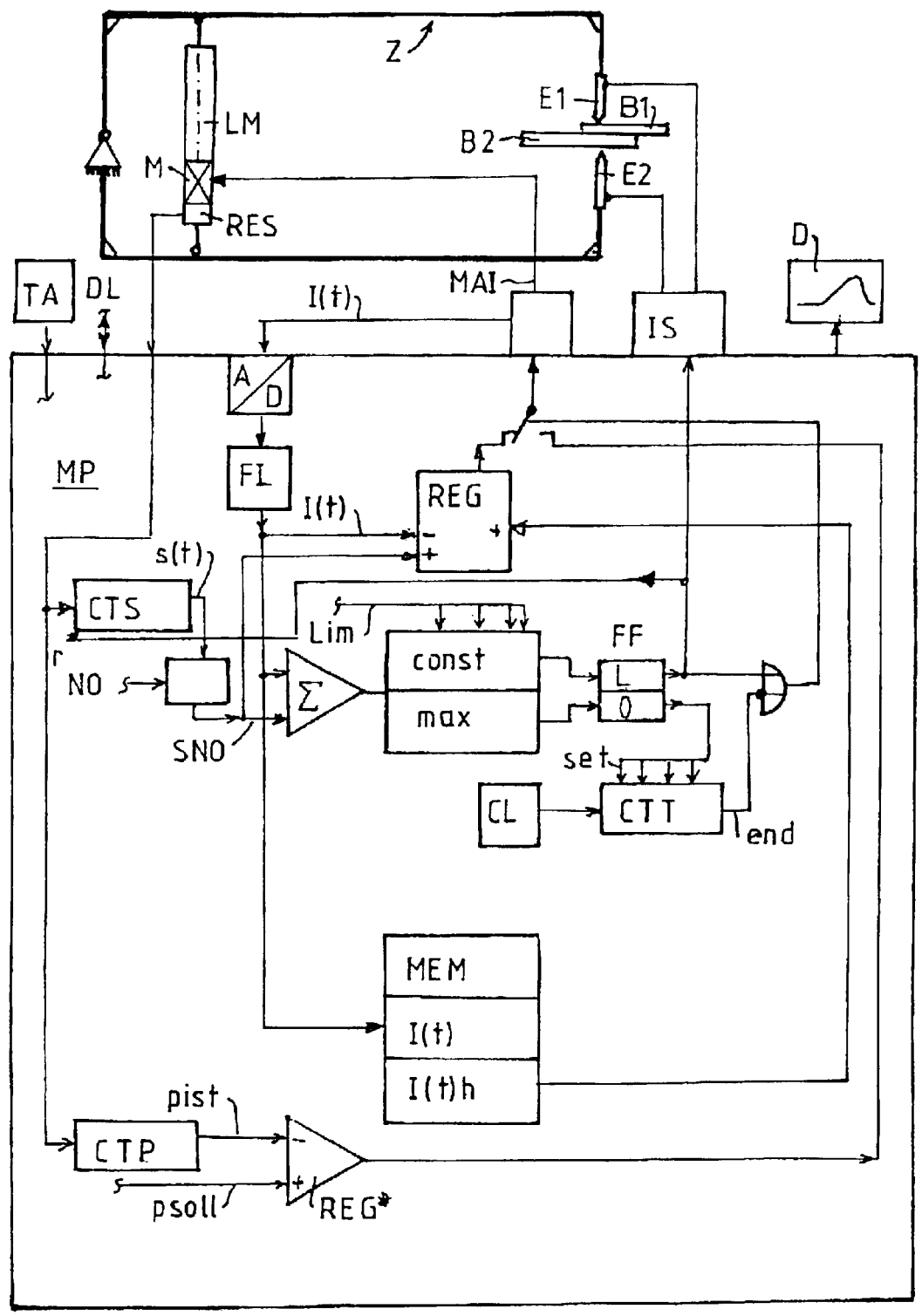
FIG. 1 shows a function diagram of the device.

FIG. 1 shows an electrode holder (Z) with the two welding electrodes (E1, E2), between which the welding object, the two metal sheets (B1, B2), are held clamped together. The clamping force is generated by the linear drive (LM), which preferrably consists of a circulating ball spindle with a drive motor (M) that is actuated with a motor actuation current (MAI) and the revolutions of which are signaled by an angular-motion transducer (RES) by angular forward and reverse pulses or phase-shifted pulses, from which directional pulses can be derived.

The welding electrodes (E1, E2) are connected to a welding current generator (IS), which can be activated and deactivated, but may also be regulated in electric current steps if special conditions on the welding object make this necessary.

The actuation of the motor (M) and welding current generator (IS) takes place via a control device, which essentially consists of a microprocessor (MP). The latter receives setting parameters and limit values (Lim) through a keyboard (TA) or similar data input medium and supplies process data, condition and alarm messages, etc. to a monitor device (D) in a known manner in numeric or image form, e.g., as a displacement curve or electric current curve. The processor (MP) is connected via a data line (DL) preferrably to a central processor if this welding station is part of a production line.

The signals from the angular-motion transducer (RES) are summed in a position counter (CTP); the position information from which is routed for closing and opening purposes as an actual position (pist) to a controller (REG*), to which an external instruction is supplied as the reference position (psoll) unless priority is given to other control criteria.

The angular-motion transducer signals (RES) are furthermore examined differentially, e.g., by measuring the distance of pulses in the same direction, for a quasi-standstill (const) and for the exceeding of a maximum (max) that results from a direction reversal of the angular-motion transducer pulses. These evaluations (const, max) go hand in hand with a filtration, averaging, or the like, so that only really relevant conditions are utilized for the added control. The adjustment parameters (Lim) are provided externally.

If, during a closing actuation current supply to the motor (M) the constant state (const) is detected, it is recorded in a condition memory (FF), which is symbolized as a flipflop, which turns on the welding current generator (IS). Simultaneously, a displacement counter (CTS) is reset, which counts the angular-motion transducer signals (RES), so that the counter content (s(t)) constantly signals the distance displacement of the electrodes (E1, E2) after the welding current (IS) has been switched on, which may also be indicated, e.g., on the display (D). As soon as the condition of the passage through the maximum (max) or, depending on the setting, an approaching or leaving of the same, is detected, the constant state marker (FF) is deleted, causing the welding current generator (IS) to be turned off and a time function element (CTT) to be set to a pre-set holding time, at the termination (end) of which the open actuation of the electrode holder drive is released. The time function element (CTT) may be a pre-set counter, that is actuated counting with the signals from a clock (CL).

In a preferred embodiment the motor current (MAI) is controlled in dependence upon the position difference information (psoll, pist) and, after the constant state (const) has been reported, a certain electric current is pre-set. A certain force is accordingly created between the electrodes, and their distance follows the expansion and later shrinking condition of the object, so that in this mode of operation the new evaluation means for the angular-motion transducer signals (RES) and utilization of their signals are advantageously utilized on an electrically controlled electrode holder. No additional measuring means are necessary besides the angular-motion transducer that is always present for the displacement control. The obtained electrical signals are also utilized, after their appropriate evaluation, to turn the welding current on or off or regulate it.

In a further embodiment, a motor current measuring device (IM) is additionally provided, which is also used with conventional actuating drives of similar types when the motor current is not only adjusted but also regulated in a secondary control unit.

The electric current measuring signal (IM) is routed to the processor (MP), digitized in an analog to-digital converter (AID) and filtered in a filter (FI). With this setup, the content of the displacement counter (CTS) can in each case serve as the control criterion if the drive force during the welding time and subsequent holding time is sufficiently large, with the reference displacement being set to zero. This has the result that as the expansion force of the welds increases, an increasing motor current counteracting the same is supplied by the controller. Since the electrode displacement is nearly zero due to the increased clamping pressure of the electrodes, it is virtually impossible to determine a displacement maximum and the electric current maximum is determined instead. For this purpose, the digitized and filtered electric current curve signal (I(t)) is routed to the maximum detector (max). In the illustration the electric current and displacement signal time curves (I(t), s(t)) are summed according to a matching standardization (NO), e.g., that of the displacement signal (SNO), and routed to the maximum detector (max) and constancy detector (const) in this manner. Both signal curves are thus taken into account simultaneously and the result is not dependent solely upon the electric current curve.

This permits an improved control behavior with a known behavior of the welds and an accompanying desired electric current curve. The latter is supplied to the drive current controller as a reference value component, which is added to the displacement-to-zero component. A suitable electric current reference curve (I(t)h) is advantageously derived from recorded empirical electric current curves (I(t)), i.e., from prior welding processes, in a memory (MEM). If this process of recording and subsequent pre-setting of the electric current curve is repeated often, a very quick control process takes place with decreasing deviations from the goal, which is to simulate a "rigid" electrode holder.

The design of the individual function components, which are illustrated by hardware symbols, is preferably performed in the form of a control program with sub-program components. In this manner parameters can easily be changed and the impact of such changes in the control sequence and in the response of the electrode holder mechanism and in the object can be examined by monitoring and generating the measured parameters or derived parameters. The counting processes may be performed in a known manner with an interrupt control to which, e.g., the angular-motion transducer signals (RES) or the increment/decrement signals from the analog-to-digital converter are routed.

Figure 2:
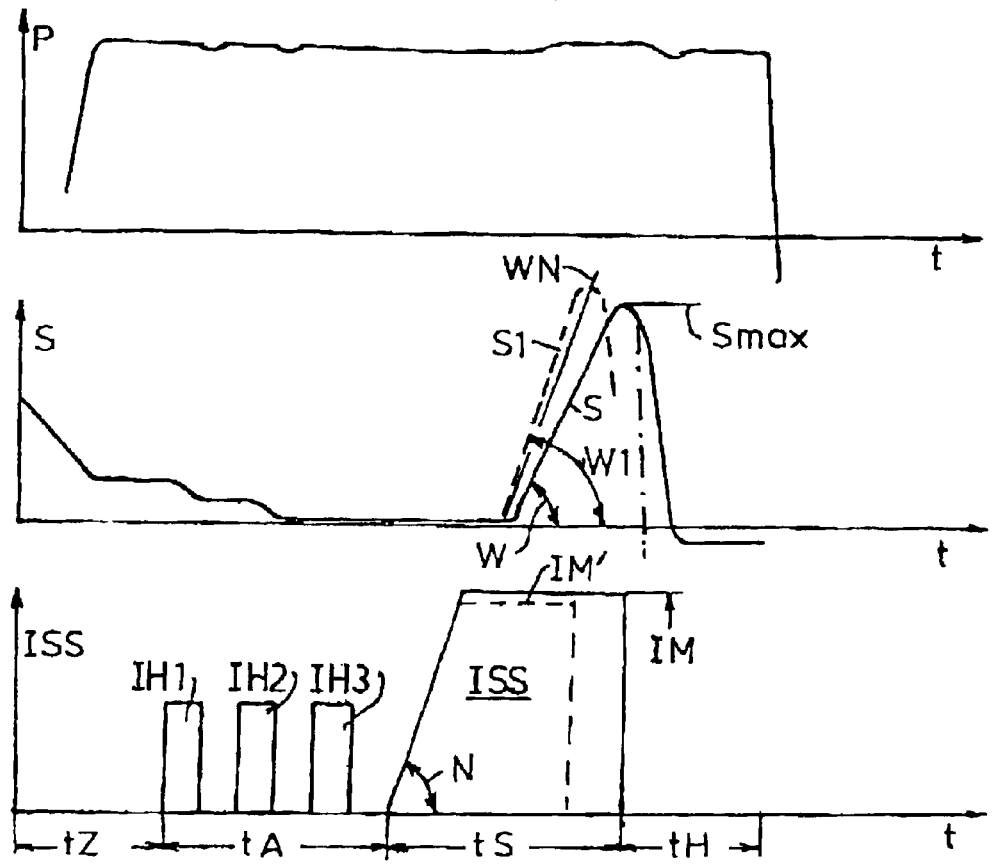
FIG. 2 shows examples for signal time curves.

FIG. 2 shows the time curves of the action and reaction parameters of a resistance spot welding process in which the special cases are taken into consideration that thick metal plates are relaxed and settled prior to the welding and the increase in the welding current is carried out slowly because of a critical alloy of the materials and/or a sensitive coating.

The electrode holder current ISS is applied in advance in three heating pulses IH1–IH3 in intervals and the approximately twice as intense welding current pulse is subsequently fed in for a longer period of time.

During the entire welding period, which essentially consists of an electrode holder close time tZ, the heating and settling time tA consisting of multiple phases, the actual welding time tS, and the holding time tH; the force P of the electrode holder is essentially held constant by the pre-set motor current.

The reaction of the electrode distance S, which is influenced by the electrode holder force P and the electric current flow ISS onto the weld, is shown by the third depicted curve.

During the close time tZ the metal sheets are pressed together between the electrodes until the electrode distance S remains constant or the angle output comes to rest and the motor force is completely converted into the clamping force P.

During the heating time tA three heating current pulses tH1–tH3 of a medium intensity are applied one after another. The heating causes the metal sheets to gradually relax, causing a settling of the electrodes with the metal sheets to occur in corresponding steps, as shown by the stepped progression of the electrode distances. The first two heating current pulses IH1, IH2 were already for a complete settling, the third reserve heating pulse produces no further settling.

During the welding time tS the welding current increases with a rate of rise N to its respective given maximum value IM. The gentle current increase serves to gently insert the electrodes into a surface coating, e.g., zinc, with a low melting point and to prevent a run-out of the molten material from the melting point, especially in the case of a high-alloy sheet steel material. During the welding current generation, the weld increases due to the thermal expansion of the metal sheets and the enclosed generated melted material, which gradually increases the electrode distance S until the distance increase slows down and a maximum Smax has been reached.

FIG. 2 furthermore shows, in a dashed line, a time curve of the expansion S1 of high-tensile steel in comparison to the gap displacement S of regular steel under otherwise identical conditions. The high-tensile steel expands considerably faster and the cutoff of the welding current accordingly takes place significantly sooner. Utilizing this effect, the change of the gap width over time, which is represented as an angle W, W1, is determined at the beginning of the measured expansion of the weld and from it, it is determined when the electric current shutoff should take place relative to the occurring expansion maximum, or how steep the electric current increase will be preset in the future.

This method eliminates the need in the automatic determination of the optimum parameters to have a run-out of the melted material occur in the first place.

The steeper the increase in the gap width S, S1, the sooner the electric current cutoff will take place with respect to the maximum of the gap width S, S1.

In a further embodiment, the speed of the weld expansion, which is represented by the angle of slope W, W1 in the figure, is advantageously measured and utilized directly as a regulating criteria for the selection of the electric current increase speed and especially for the maximum electric current intensity IM. If the angle of increase W1 is greater than a standard angle WN, as in the example, the maximum electric current IM is reduced and, conversely, when the weld expands too slowly, the electric current increase N and/or maximum electric current IM is increased. In this manner the electric current supply control is regulated directly. It compensates not only for differences in the types of material but also for other changes on the welding object or welding equipment, such as an increasing flattening of the welding electrodes, in such a way that the maximum electric current increases and the welding time is not extended in an undesirable manner.

This type of welding current regulation has an inventive quality of it own and can be performed not only with the angle transducer signals of the motor that have been described here, but also with measuring signals of a known dynamometer on the electrode holder or another expansion or distance meter.

Figure 3:
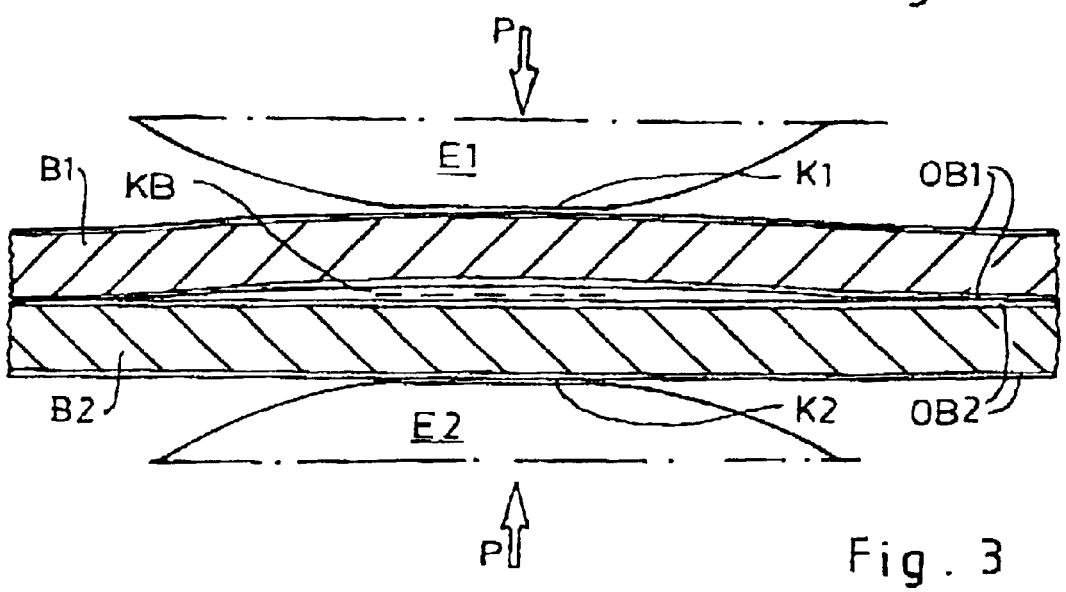
FIG. 3 shows a resistance welding zone enlarged in a section.

FIG. 3 shows an enlarged axial section through a weld at the end of the close time of the electrodes E1, E2. The depiction shows relatively thick metal plates B1, B2, the contact region KB of which is not yet closed since the metal plates B1, B2 are slightly dented there, as has been shown emphasized.

The electrode tips E1, E2 are rounded approximately ball-shaped and flattened in the relatively small contact areas K1, K2 to the metal sheets B1, B2. The flattened contact areas K1, K2 are pressed slightly into the surface coatings OB1, OB2, so that a relatively small transitional resistance is created there and virtually no material melts or splatters out of that area or alloys onto the electrodes, which would result in their softening and, soon afterwards, their deformation, which would cause a deterioration in the transition and contact pressure conditions and a reworking of the electrodes would have to be performed.

What is claimed is:

1. A control device for spot welding with an electrode holder (Z), the welding electrodes (E1, E2) of which are connected to a controllable welding current generator (IS), and which can be actuated to open and close by means of an electric motor drive (M) having a position sensor disposed on it, the signals of which are used by a control device (MP) to actuate the electrode holder (Z) to open and close according to predefined settings (psoll), and wherein, in the closed position of the electrode holder (Z), the same holds welding objects (B1, B2) clamped between the welding electrodes (E1, E2) by means of a predefined motor current (MAI), wherein the welding current generator (IS) is activated at certain times by the control device (MP), and wherein the position sensor is an angular-motion signal transducer, resolver (RES), and the control device (MP) comprises monitoring devices (const, max) to which the angular-motion transducer signals are continually routed and wherein, as soon as this monitoring device (const) senses a quasi standstill on the angular-motion transducer signals after a closing actuation of the electrode holder (Z), a corresponding first state is recorded as the closed position of the electrode holder (Z) and the welding current generator (IS) is activated and a time curve of a welding electrode distance (CTS) is then determined from the resolver signals (RES), in dependence upon which time curve the motor current (MAI) and/or the welding current of the welding current generator are pre-set with a different setting, so that the curve of the welding electrode distance (CTS) approximates a pre-recorded curve of an optimal welding process, characterized in that, in the closed position, the motor current (MAI) is regulated such that a welding electrode distance (CTS), which is continually determined by summing the angular-motion transducer signals (RES), is held nearly constant or according to a pre-set time curve.

2. A control device according to claim 1, characterized in that a motor current measuring signal (I(t)) is continually routed to the monitoring device (const), where it is digitized and filtered and routed to the monitoring device (const, max) standardized and summed together with the given welding electrode distance value (CTS).

3. A control device according to claim 2, characterized in that the curve of the processed motor current measuring signal (I(t)) is recorded in a memory (MEM) and made available for subsequent welding process in each case as a motor current reference value component (I(t)h), to which the standardized welding electrode distance (SNO) is added as a further reference value component, and the thus created reference current value supplies the motor current (MAI) via a motor current regulator.

4. A control device according to claim 3, characterized in that the welding current generator (IS) is actuated in such a way that the supplied welding current (IS) increases time-delayed to a pre-set maximum current (IM).

5. A control device according to claim 4, characterized in that the angular-motion transducer signals (RES) and/or the motor current measuring signal (I(t)) are monitored for an abrupt change close to or after the end of the welding current supply and an error message is issued when it occurs and a greater delay in the welding current increase and/or a stepped reduction of the maximum current (IM) is pre-set for a subsequent welding cycle.

6. A control device according to claim 5, characterized in that when a parameter adjustment series of welding processes is performed, the maximum electric current (IM) is increased in steps with each welding process until an abrupt change of the angular-motion transducer signals (RES) or motor current measuring signal (I(t)) close to or after the end of the welding current supply signals a disruption, whereupon the maximum electric current (IM) is pre-set lower for the subsequent welding processes.

7. A control device according to claim 6, characterized in that after the electrode holder (Z) is closed, the welding current generator (IS) supplies at least one heating current pulse (tH1–tH3) that is significantly shorter and/or lower than the welding current pulse (ISS), wherein a reduction in the welding electrode distance (S) is monitored by observing the angular-motion transducer signals (RES) and/or the motor current measuring signal (I(t)) and, when the welding current electrode distance (S) is reduced by less than a predefined amount, no further heating current pulse (tH2, tH3) is emitted, but the welding current (ISS) is generated by the welding current generator (IS).

8. A control device according to claim 7, characterized in that a displacement speed (W, W1) of a welding electrode distance (S, S1) is measured directly or indirectly during the welding time (tS) and, depending on whether a pre-set displacement speed (WN) is exceeded or undercut, the welding current (ISS) is switched off earlier or later relative to the occurrence of a maximum (Smax) of a welding electrode distance (S, S1), and/or pre-set like this for the next welding process.

9. A regulating device having a control device according to claim 8, characterized in that a displacement speed (W, W1) of a welding electrode distance (S, S1) is measured directly or indirectly during the welding time (tS) and, depending on whether a pre-set displacement speed (WN) is exceeded or undercut, a rate of rise (N) of the electric current increase and/or a maximum electric current (IM) is pre-set either reduced or increased for the welding current generator (IS).

10. A control device according to claim 2, characterized in that the welding current generator (IS) is actuated in such a way that the supplied welding current (IS) increases time-delayed to a pre-set maximum current (IM).

11. A control device according to claim 2, characterized in that the angular-motion transducer signals (RES) and/or the motor current measuring signal (I(t)) are monitored for an abrupt change close to or after the end of the welding current supply and an error message is issued when it occurs and a greater delay in the welding current increase and/or a stepped reduction of the maximum current (IM) is preset for a subsequent welding cycle.

12. A control device according to claim 2, characterized in that when a parameter adjustment series of welding processes is performed, the maximum electric current (IM) is increased in steps with each welding process until an abrupt change of the angular-motion transducer signals (RES) or motor current measuring signal (I(t)) close to or after the end of the welding current supply signals a disruption, whereupon the maximum electric current (IM) is pre-set lower for the subsequent welding processes.

13. A control device according to claim 2, characterized in that after the electrode holder (Z) is closed, the welding current generator (IS) supplies at least one heating current pulse (tH1–tH3) that is significantly shorter and/or lower than the welding current pulse (ISS), wherein a reduction in the welding electrode distance (S) is monitored by observing the angular-motion transducer signals (RES) and/or the motor current measuring signal (I(t)) and, when the welding current electrode distance (S) is reduced by less than a predefined amount, no further heating current pulse (tH2, tH3) is emitted, but the welding current (ISS) is generated by the welding current generator (IS).

14. A control device according to claim 2, characterized in that a displacement speed (W, W1) of a welding electrode distance (S, S1) is measured directly or indirectly during the welding time (tS) and, depending on whether a pre-set displacement speed (WN) is exceeded or undercut, the welding current (ISS) is switched off earlier or later relative to the occurrence of a maximum (Smax) of a welding electrode distance (S, S1), and/or pre-set like this for the next welding process.

15. A control device according to claim 1, characterized in that the welding current generator (IS) is actuated in such a way that the supplied welding current (IS) increases time-delayed to a pre-set maximum current (IM).

16. A control device according to claim 1, characterized in that the angular-motion transducer signals (RES) and/or the motor current measuring signal (I(t)) are monitored for an abrupt change close to or after the end of the welding current supply and an error message is issued when it occurs and a greater delay in the welding current increase and/or a stepped reduction of the maximum current (IM) is pre-set for a subsequent welding cycle.

17. A control device according to claim 1, characterized in that when a parameter adjustment series of welding processes is performed, the maximum electric current (IM) is increased in steps with each welding process until an abrupt change of the angular-motion transducer signals (RES) or motor current measuring signal (I(t)) close to or after the end of the welding current supply signals a disruption, whereupon the maximum electric current (IM) is pre-set lower for the subsequent welding processes.

18. A control device according to claim 1, characterized in that after the electrode holder (Z) is closed, the welding current generator (IS) supplies at least one heating current pulse (tH1–tH3) that is significantly shorter and/or lower than the welding current pulse (ISS), wherein a reduction in the welding electrode distance (S) is monitored by observing the angular-motion transducer signals (RES) and/or the motor current measuring signal (I(t)) and, when the welding current electrode distance (S) is reduced by less than a predefined amount, no further heating current pulse (tH2, tH3) is emitted, but the welding current (ISS) is generated by the welding current generator (IS).

19. A control device according to claim 1, characterized in that a displacement speed (W, W1) of a welding electrode distance (S, S1) is measured directly or indirectly during the welding time (tS) and, depending on whether a pre-set displacement speed (WN) is exceeded or undercut, the welding current (ISS) is switched off earlier or later relative to the occurrence of a maximum (Smax) of a welding electrode distance (S, S1), and/or pre-set like this for the next welding process.

20. A regulating device having a control device according to claim 1, characterized in that a displacement speed (W, W1) of a welding electrode distance (S, S1) is measured directly or indirectly during the welding time (tS) and, depending on whether a pre-set displacement speed (WN) is exceeded or undercut, a rate of rise (N) of the electric current increase and/or a maximum electric current (IM) is pre-set either reduced or increased for the welding current generator (IS).

* * * * *